(12) United States Patent
Kinoshita et al.

(10) Patent No.: US 8,645,979 B2
(45) Date of Patent: Feb. 4, 2014

(54) OPTICAL PICKUP

(75) Inventors: Yasushi Kinoshita, Hitachinaka (JP); Jun Hato, Fujisawa (JP); Kazuhiro Todori, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/435,665

(22) Filed: Mar. 30, 2012

(65) Prior Publication Data

US 2012/0260273 A1  Oct. 11, 2012

(30) Foreign Application Priority Data

Apr. 5, 2011 (JP) ................................. 2011-083995

(51) Int. Cl.
*G11B 21/02* (2006.01)

(52) U.S. Cl.
USPC ........................................................ 720/681

(58) Field of Classification Search
USPC ........................................................ 720/681
See application file for complete search history.

(56) References Cited

U.S. PATENT DOCUMENTS

| | | | | |
|---|---|---|---|---|
| 6,058,098 A * | 5/2000 | Kato | ............................. | 720/663 |
| 6,657,943 B2 * | 12/2003 | Muto et al. | .................... | 720/619 |
| 6,683,841 B2 * | 1/2004 | Lin | ............... | 720/665 |
| 6,724,714 B1 * | 4/2004 | Kato et al. | .................... | 720/672 |
| 6,947,369 B2 * | 9/2005 | Liao | ............... | 369/223 |
| 7,055,161 B2 * | 5/2006 | Choi | ............................. | 720/675 |
| 7,284,253 B2 * | 10/2007 | Youn et al. | .................... | 720/676 |
| 7,352,679 B2 * | 4/2008 | Ohno | ............................. | 369/223 |
| 7,359,292 B2 * | 4/2008 | Omori et al. | ............... | 369/44.14 |
| 7,525,899 B2 * | 4/2009 | Ryu | ............................. | 369/223 |
| 8,413,178 B2 * | 4/2013 | Ando | ............................. | 720/679 |

FOREIGN PATENT DOCUMENTS

| | | | |
|---|---|---|---|
| JP | 2005-093037 A | 4/2005 |
| JP | 2005-216344 A | 8/2005 |
| JP | 2009-026410 A | 2/2009 |

* cited by examiner

*Primary Examiner* — Mark Blouin
(74) *Attorney, Agent, or Firm* — Mattingly & Malur, PC

(57) ABSTRACT

An optical pickup includes a lens moving mechanism constructed of a lens, a lens holder holding the lens, a guide member guiding the lens holder, a lead screw including a thread groove, a motor rotating the lead screw, and a rack gear including a body fixed to the lens holder and claws fitted into the thread groove of the lead screw, in which an arm connecting the body and the claws of the rack gear is formed so that the shape of a cross section perpendicular to the rotational axis direction of the lead screw is a convex shape, a recess shape or a wave-shape.

10 Claims, 3 Drawing Sheets

OPTICAL PICKUP

CLAIM OF PRIORITY

The present application claims priority from Japanese Patent application serial No. 2011-83995, filed on Apr. 5, 2011, the content of which is hereby incorporated by reference into this application.

TECHNICAL FIELD

The present invention relates to an optical pickup writing/reading information on/from a recording surface of an optical disc.

BACKGROUND ART

In order to increase the capacity of an optical disc, a laser beam with a short wavelength and an object lens with a large numerical aperture are used for writing and reading information. Thus, a laser spot condensed on a recording layer of the optical disc can be made small, and recording density can be improved.

Because a laser beam flux penetrates a protection layer of the optical disc and reaches the recording layer, a focal length slightly differs between the inside and the outside of the laser beam flux due to change in the thickness of the protection layer, and therefore a spherical aberration occurs. The spherical aberration can be corrected by adjusting the laser beam flux incident to an object lens to a weakly divergent beam and a weakly convergent beam. Adjustment of the laser beam flux is achieved by moving the position of a collimator lens inside the optical pickup in the optical axis direction.

The collimator lens can be moved by a screw feed mechanism converting rotational motion of a small motor to translation motion. The screw feed mechanism is constructed of a lead screw, a rack gear (or a nut) fitted into a thread groove thereof, and a guide shaft. By rotation of the small motor, the rack gear (or the nut) is pressed by the thread groove of the lead screw and moves in the motor shaft direction. The collimator lens is moved by keeping a lens holder mounted with the collimator lens be pressed to the rack gear (or the nut).

As a related art of the present field of the invention, there is Japanese Patent Laid-open No. 2005-216344 (PTL 1) for example.

In PTL 1, it is disclosed that a rack body is configured that teeth attached to the surface of a board abut upon the surface of a lead screw shaft, the rack body is moved by rotation of the lead screw shaft, and the lens is moved.

Thus, PTL 1 discloses a screw feed mechanism using a rack gear as a moving means for an optical pickup mounted on an optical disc drive.

Further, similarly to PTL 1, Japanese Patent Laid-open No. 2009-26410 (PTL 2) also discloses, as a moving mechanism for the collimator lens, a structure in which meshing teeth attached to the surface of a rack member move along the thread ridge of a lead screw.

CITATION LIST

Patent Literature

[PTL 1] Japanese Patent Laid-open No. 2005-216344
[PTL 2] Japanese Patent Laid-open No. 2009-26410

SUMMARY OF INVENTION

Technical Problem

Meanwhile, an optical pickup is required to mount a number of optical parts in a case in order to cope with writing and reading for optical discs of CD, DVD and BD (Blu-ray Disc). Therefore, it is necessary to make the wall of the case of the optical pickup thin and to secure the area for mounting the optical parts. However, when the wall of the case is made thin, the strength of the case of the optical pickup is weakened to the limit at that rate, and therefore it becomes difficult to secure the tolerance of the environmental tolerance performance such as the impact resistance.

On the other hand, because a collimator lens moving mechanism (hereinafter referred to as a lens moving mechanism) requires a mounting area for a screw feed mechanism including a motor and a moving area for a collimator lens and a lens holder, it occupies a wide area inside the case of the optical pickup.

Thus, in order to improve the environmental tolerance performance of the optical pickup, miniaturization of the lens moving mechanism has become essential.

An object of the present invention is to provide an optical pickup miniaturizing a lens moving mechanism and capable of securing an area for mounting optical parts in the inside of a case of the optical pickup and obtaining the tolerance of the environmental tolerance performance.

Solution to Problem

The object is achieved by an optical pickup including a lens moving mechanism constructed of a lens holder holding a lens, a guide member guiding the lens holder, a lead screw including a thread groove on an outer periphery, a motor rotating the lead screw, and a rack gear including a body fixed to the lens holder and claws fitted into the thread groove of the lead screw, in which the rack gear includes an arm connecting the body and the claws, and plural projections extending in the rotational axis direction of the lead screw are arranged on the surface of the arm.

It is preferable that plural grooves extending in the rotational axis direction of the lead screw are arranged in the arm.

It is preferable that plural grooves are arranged on a back surface of the arm opposing the grooves extending in the rotational axis direction of the lead screw.

It is preferable that a cross-sectional shape of the arm is a wave-shape extending in the rotational axis direction of the lead screw.

It is preferable that the arm is configured so that a shape of a cross section perpendicular to the rotational axis direction of the lead screw is constant over entire width of the rack gear.

Advantageous Effects of Invention

According to the present invention, it is possible to provide an optical pickup miniaturizing the lens moving mechanism and capable of securing the area for mounting the optical parts in the inside of the case of the optical pickup and obtaining the tolerance of the environmental tolerance performance.

DESCRIPTION OF EMBODIMENTS

Meanwhile, a lens moving mechanism actuates a collimator lens by move claws of a rack gear engaging with a thread groove formed on the surface of a lead screw rotated by a motor.

However, as described above, despite that a wall of a case of an optical pickup is made thin and a space inside the case is in the direction of expanding as much as possible, the lens moving mechanism occupies a wide area inside the case of the optical pickup because a motor and a lead screw are included. Particularly, the length of a motor shaft was a cause of occupying the area.

Therefore, the present inventors studied the possibility of shortening the motor shaft, and found that the motor shaft could be shortened when the stroke amount of the collimator lens, the width of the rack gear and the width of a margin rack were narrowed. In other words, when the width of the rack gear is shortened, the motor shaft can be shortened, therefore the lead screw can be shortened, and the stroke amount of the collimator lens can be shortened.

However, as a result of various studies using a new rack gear with the shortened width, the bending rigidity and twisting rigidity of the rack gear itself dropped, and a new problem of tooth skipping between the lead screw and the claws of the rack gear occurred.

Therefore, the present inventors made intensive studies on the structure of the rack gear capable of sufficiently increasing the twisting rigidity while maintaining the bending rigidity although the width of the rack gear was reduced, and obtained embodiments as described below.

Hereinafter, embodiments of the present invention will be described describing a general optical pickup referring to FIG. 1 and FIG. 2.

Embodiment 1

Figure 1:
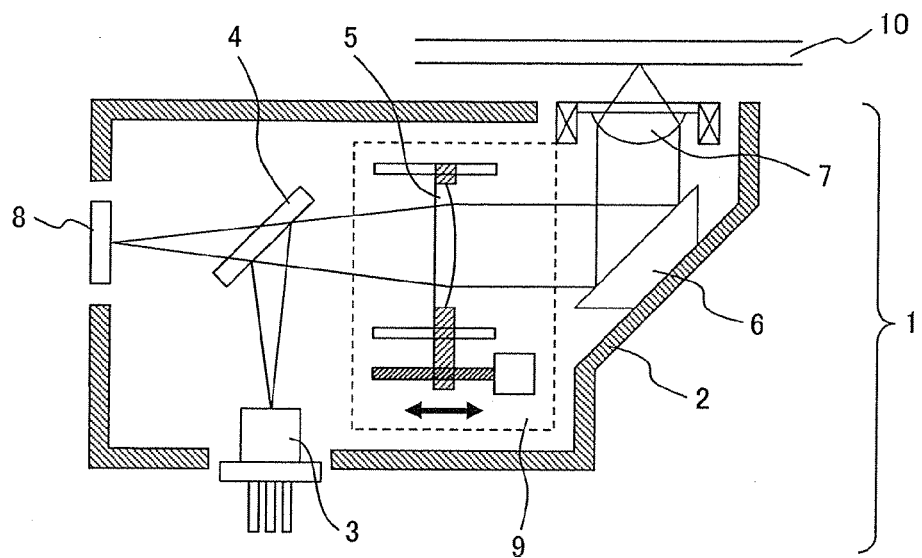
FIG. 1 is a schematic constitutional drawing of a general optical pickup.

FIG. 1 is an outline constitutional drawing of a general optical pickup.

In FIG. 1, 1 is an optical pickup, 2 is a case, 3 is a laser beam source, 4 is a beam splitter, 5 is a collimator lens, 6 is a reflection mirror, 7 is an object lens, 8 is a photo-detector, 9 is a lens moving mechanism, and 10 is an optical disc.

The optical pickup 1 is configured that the laser beam source 3, the beam splitter 4, the collimator lens 5, the reflection mirror 6, the object lens 7, the photo-detector 8 and the lens moving mechanism 9 are mounted in the inside of the case 2.

The configuration of the optical pickup 1 of FIG. 1 shows a minimum configuration. In order to cope with plural standards of the optical discs such as CD, DVD and BD (Blu-ray Disc), it may be configured to mount the plural laser beam sources 3, beam splitters 4, collimator lenses 5, reflection mirrors 6, object lenses 7, and photo-detectors 8.

The case 2 becomes a base member mounting the optical parts, and is manufactured by molding of metal or resin because a complicated shape is required. The laser beam source 3 is a semiconductor laser element irradiating a laser beam of a specific wavelength stipulated by CD, DVD and BD standards. The beam splitter 4 is an optical part splitting the laser beam into transmitted light and reflected light.

For example, the beam splitter 4 is a prism obtained by adhering two rectangular prisms together or a mirror obtained by forming an optical layer on a glass sheet. The collimator lens 5 is an optical lens converting divergent light of the laser beam into parallel light. The reflection mirror 6 is a mirror totally reflecting the laser beam. Because the laser beam is bent by 90 degrees from the inside of the case 2 of the optical pickup 1 toward the optical disc 10, the reflection mirror 6 is attached at the inclination of 45 degrees.

The object lens 7 is a lens focusing the parallel light of the laser beam. In order to focus the laser beam to a recording pit of the optical disc 10, the object lens 7 is configured so as to move in the plane direction of the optical disc 10 (focusing) and to move in the radial direction of the optical disc 10 (tracking). Also, the object lens 7 may be configured so as to adjust the angle (tilting) so that the laser beam is applied to the optical disk 10 perpendicularly. The photo-detector 8 is a photoelectric conversion element generating an electric signal according to the quantity of light of the laser beam irradiated to the detection surface. The lens moving mechanism 9 is a mechanism moving the collimator lens 5 in the optical axis direction.

The action of the optical pickup 1 will be described. The laser beam emitted from the laser beam source 3 is reflected by the beam splitter 4, reaches the collimator lens 5, and is converted into the parallel light. Further, the laser beam is reflected to the optical disc 10 direction by the reflection mirror 6, focused onto the recording surface of the optical disc 10 by the object lens 7, and forms a beam spot.

In the optical pickup 1, writing and reading of information onto and from the optical disc 10 is performed by the beam spot. With respect to writing, on/off switching of the laser beam source 3 is performed based on recorded information to flicker the beam spot, the recording pit is formed on the optical disc 10, and thereby information is written. With respect to reading, the beam spot is applied to the recording pit of the optical disc 10, and the laser beam reflected by the recording pit is received by the object lens 7. The laser beam passes the reflection mirror 6, the collimator lens 5, and the beam splitter 4 in this order which is reverse to the outgoing leg, and is led onto the detection surface of the photo-detector 8. The photo-detector 8 reads information by on/off of the laser beam applied to the detection surface.

Figure 2:
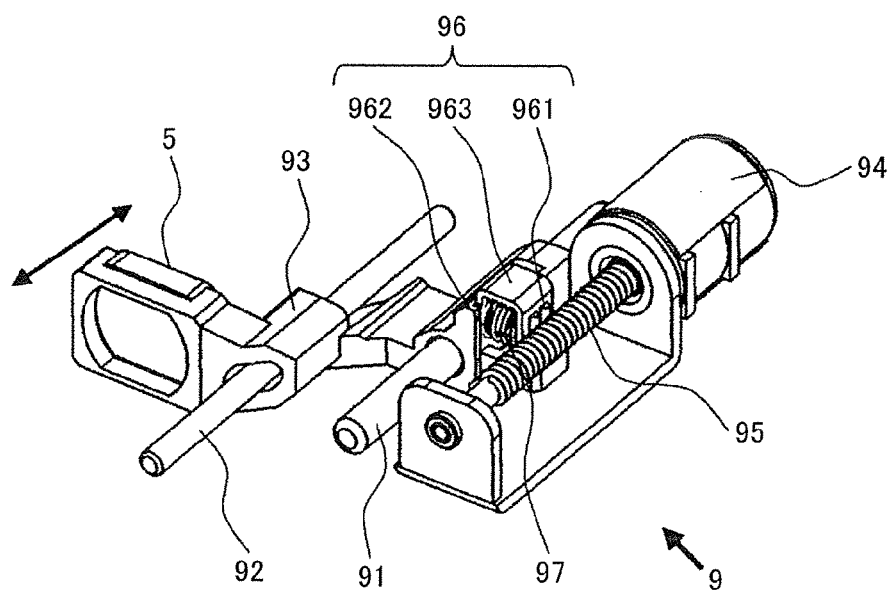
FIG. 2 is a perspective view of a lens moving mechanism shown in FIG. 1.

FIG. 2 is a perspective view of the lens moving mechanism 9 shown in FIG. 1.

In FIG. 2, 5 is the collimator lens, 91, 92 are guide members, 93 is a lens holder, 94 is a motor, 95 is a lead screw, 96 is a rack gear, and 97 is a compression spring.

The configuration of the lens moving mechanism 9 will be described. The lens moving mechanism 9 is constructed of the collimator lens 5, the guide members 91, 92, the lens holder 93, the motor 94, the lead screw 95, the rack gear 96, and the compression spring 97. The guide members 91, 92 are shafts obtained by subjecting the surface of main material of an iron and steel material excellent in dimensional stability such as a stainless steel round bar to plating of nickel, chromium and the like to improve the abrasion resistance. A lubricant may be coated on the guide members 91, 92 in order to improve the slide resistance and the abrasion resistance. The lens holder 93 is a support member holding the collimator lens 5, and is a movable member extended between the guide member 91 and the guide member 92 and moving integrally with the collimator lens 5. The lens holder 93 is made from a PPS (polyphenylene sulfide) resin, a LCP (liquid crystal polymer) resin and the like light in weight and having high strength.

The motor 94 is a drive source generating a rotational force such as a stepping motor and the like. The lead screw 95 is obtained by forming the thread groove at a constant pitch on the rotary shaft of the motor 94. The rack gear 96 is a power transmission component including claws 961 fitted into the thread groove of the lead screw 95, a body 962 fixed to the lens holder 93, and a U-shape arm 963 connecting the claws 961 and the body 962.

By configuring the rack gear 96 and the lead screw 95 by a pair, a screw feed mechanism converting a rotational motion of the motor 94 into a translational motion is formed. The rack gear 96 is made from a POM (polyacetal) resin excellent in the abrasion resistance. In order to improve the slide resistance and the abrasion resistance, a lubricant may be coated in a position where the claws 961 and the lead screw 95 are in contact with each other. The compression spring 97 is a coil spring obtained by coiling stainless steel wires for springs and the like.

The action of the lens moving mechanism 9 will be described. The lens moving mechanism 9 converts a rotational motion of the motor 94 into a translational motion of the rack gear 96 by the feed screw mechanism formed of the lead screw 95 and the rack gear 96. The rack gear 96 transmits a translational force to the lens holder 93 to which the rack gear 96 is fixed. The lens holder 93 and the collimator lens 5 are capable of performing parallel movement in the optical axis direction of the collimator lens 6 guided by the guide members 91, 92.

The screw feed mechanism using the rack gear 96 has problems to be solved as described below.

The first problem is drop of the spring rigidity of the rack gear 96. The distance between the lead screw 95 of the motor 94 and the guide member 91 varies due to an assembly error. When the distance between the lead screw 95 and the guide member 91 is long, the claws 961 of the rack gear 96 are liable to depart from the thread groove of the lead screw 95. Therefore, it is configured that the compression spring 97 is furnished to the U-shape arm 963 of the rack gear 96, and a pressing force is applied to the lead screw 95 always by a restoring force of the compression spring 97.

On the other hand, when the distance between the lead screw 95 and the guide member 91 is short, the restoring force of the compression spring 97 increases because the compression amount increases, and the pressing force applied to the lead screw 95 is increased. When the pressing force increases, rotational load of the lead screw 95 is increased, and the problem of the motor 94 such as stepping out is liable to occur. Stepping out of the motor 94 becomes a problem because the positional reproducibility of the collimator lens 5 is spoiled.

Accordingly, it is required to design the lens moving mechanism 9 so that the pressing force of the rack gear 96 does not vary largely even when the distance between the lead screw 95 and the guide member 91 varies due to the assembly error. The spring rigidity (pressing force/displacement) of the rack gear 96 is the sum of the bending rigidity of the U-shape arm 963 of the rack gear 96 and the spring constant of the compression spring 97. In order to reduce the spring rigidity of the rack gear 96, it is necessary to lower the bending rigidity of the U-shape arm 963 of the rack gear 96 as much as possible.

Another problem is increase of the twisting rigidity of the rack gear 96. To the claws 961 of the rack gear 96, a translational force in the moving direction is applied. When the twisting rigidity of the rack gear 96 is low, the moving amount of the lead screw 95 is absorbed by the twist of the rack gear 96, and therefore the moving amount of the collimator lens 4 decreases.

In particular, when the moving direction of the collimator lens 4 changes, the moving amount is absorbed by the twisted amount in both directions of the rack gear 96. Reduction of the moving amount due to the twist of the rack gear 96 lowers the positioning accuracy of the collimator lens 4 and affects the accuracy of spherical aberration correction of the optical pickup 1, which is a problem. Because the twist of the rack gear 96 occurs in the U-shape arm 963 of the rack gear 96, in order to increase the twisting rigidity of the rack gear 96, it is necessary to increase the twisting rigidity of the U-shape arm 963 of the rack gear 96 as much as possible.

Figure 3:
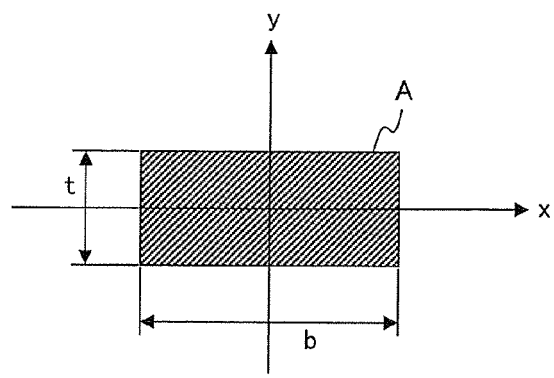
FIG. 3 is an explanatory drawing explaining the moment of inertia of area and the polar moment of inertia of area of a flat plate.

FIG. 3 is an explanatory drawing explaining the moment of inertia of area and the polar moment of inertia of area of a flat plate.

$$I_x = bt^3/12 \qquad \text{[Expression 1]}$$

$$I_p = I_x + I_y = (bt^3 b^3 t)/12 \qquad \text{[Expression 2]}$$

The expression 1 expresses a formula for the moment of inertia of area of a flat plate and the expression 2 expresses a formula for the polar moment of inertia of area of a flat plate.

In FIG. 3, the expression 1 and the expression 2, A is the cross section of the flat plate, b is the width of the flat plate, t is the thickness of the flat plate, x is the axis in the width b direction of the flat plate, y is the axis in the thickness t direction of the flat plate, $I_x$ is the moment of inertia of area of the axis x, $I_y$ is the moment of inertia of area of the axis y, and $I_p$ is the polar moment of inertia of area.

The moment of inertia of area $I_x$ of the cross section relates with the bending rigidity of the flat plate, and the polar moment of inertia of area $I_p$ of the cross section relates with the twisting rigidity of the flat plate. In a case of the flat plate, the moment of inertia of area $I_x$ is expressed by the expression 1 obtained by multiplying the width b of the flat plate and the cube of the thickness t of the flat plate. The polar moment of inertia of area $I_p$ is expressed by the sum of the moment of inertia of area $I_x$ and $I_y$ of the axis x and the axis y.

From these formulae, when the width b of the rack gear 96 is narrowed, the bending rigidity decreases proportionately, however the twisting rigidity decreases generally proportionately to the cube, which shows that the structure becomes liable to be twisted.

Due to these reasons, in the present embodiment, unevenness was arranged on the surface of the U-shape arm 963 of the rack gear 96. The U-shape arm 963 is designed beforehand so that the twisting rigidity becomes high by the unevenness. By increasing the twisting rigidity beforehand, sufficient twisting rigidity can be secured even when the width b is narrowed.

Hereinafter, an embodiment of the present invention will be described according to the drawing.

Figure 4:
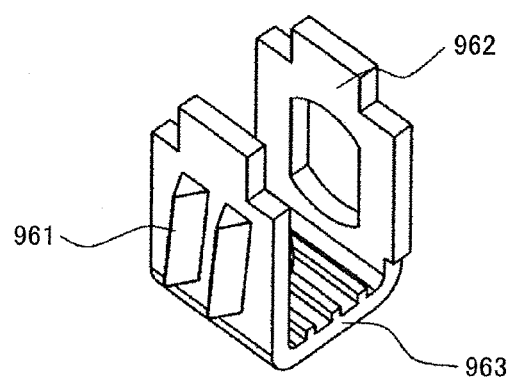
FIG. 4 is a perspective view of a rack gear in relation with an embodiment 1.

FIG. 4 is a perspective view of a rack gear in relation with an embodiment 1.

In the present embodiment in FIG. 4, projections are arranged on the surface of the U-shape arm 963 of the rack gear 96. The projections extend over the entire width of the rack gear 96 and are formed so as to rise and fall from the claws 961 of the rack gear 96 toward the body 962. When the height of the projections is increased, the thickness t comes to increase, and therefore it is effective in increasing the twisting rigidity.

Although the bending rigidity also increases by increase of the thickness t, because the length of the section where the bending rigidity increases is short, the effect is small. Also, if the width of the projections is narrowed and the number of the projections is increased, smooth bending deformation can be secured and increase of the bending rigidity can be reduced.

Further, in the drawing of the present embodiment, the number of the projections is made three, however it is not limited to three and can be any number as far as the twisting rigidity can be increased and increase of the bending rigidity can be suppressed.

Embodiment 2

Figure 5:
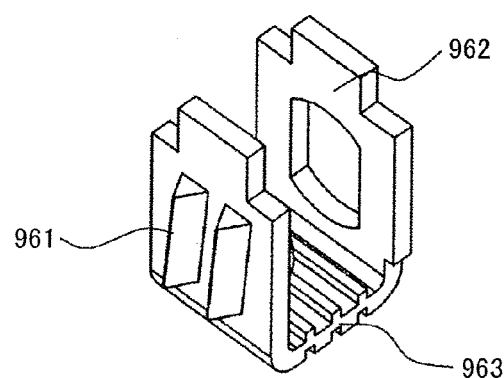
FIG. 5 is a perspective view of a rack gear in relation with an embodiment 2.

FIG. 5 is a perspective view of a rack gear in relation with an embodiment 2.

In the embodiment 2 in FIG. 5, recesses are arranged on the surface of the U-shape arm 963 of the rack gear 96, and recesses are arranged on the surface on the back side thereof.

That is, in the present embodiment, plural recesses are arranged on the front surface of the U-shape arm 963, and thick sections (convex parts) to make up for reduction of the strength by the recesses on the front surface are provided on the back surface opposing the recesses on the front surface. Recesses are formed according to the thick sections (convex parts) on the back surface.

Thus, by arranging the unevenness on both surfaces of the U-shape arm 963 also, the effect similar to that of the embodiment 1 can be secured. With the shape of arranging the unevenness on both surfaces, bending deformation can be made smoother and increase of the bending rigidity can be further reduced than with the shape of arranging projections on the surface on one side.

Also, in the drawing of the present embodiment, the number of the unevenness is made three for the front and back respectively, however it is not limited to three and can be any number as far as the twisting rigidity can be increased and increase of the bending rigidity can be suppressed.

Embodiment 3

Figure 6:
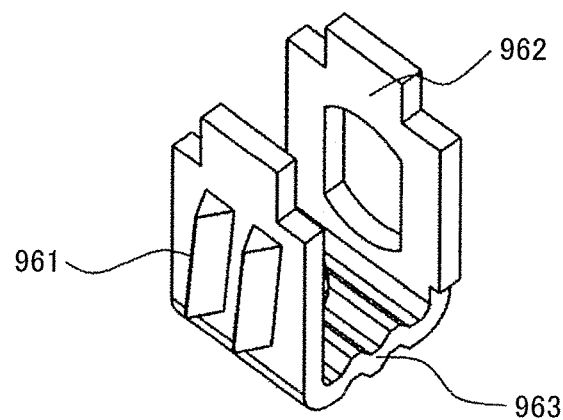
FIG. 6 is a perspective view of a rack gear in relation with an embodiment 3.

FIG. 6 is a perspective view of a rack gear in relation with an embodiment 3.

In the present embodiment in FIG. 6, wave-shape unevenness is arranged on both surfaces of the U-shape arm 963 of the rack gear 96. The wave-shape extends over the entire width, and forms the unevenness in the direction from the claws 961 of the rack gear 96 toward the body 962.

Thus, by arranging the wave-shape unevenness on the surface of the U-shape arm 963 also, the twisting rigidity can be increased. In the wave-like U-shape arm 963, because the thickness does not vary over the total area, smoother bending deformation can be achieved. Also, because the U-shape arm 963 can expand and shrink as an accordion in the direction from the claws 961 of the rack gear 96 toward the body 962, bending deformation becomes easy, which is effective in lowering the bending rigidity.

With the rack gear 96 of the shape described above, the twisting rigidity can be increased while generally maintaining the bending rigidity. Thus, the dimension of the width of the rack gear 96 can be shortened by the amount corresponding to the increased twisting rigidity.

Also, in the drawing of the present embodiment, the number of the wave shape is made two each for the front and back, however it is not limited to two and can be any number as far as the twisting rigidity can be increased and increase of the bending rigidity can be suppressed.

Figure 7:
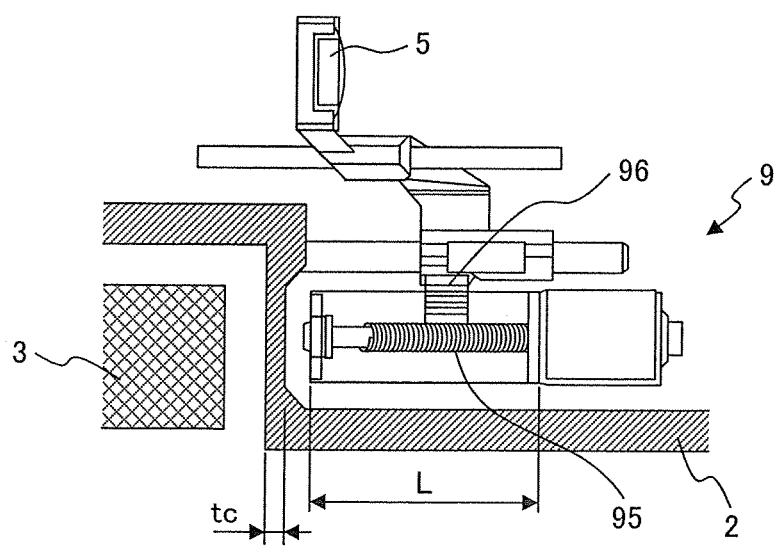
FIG. 7 is a drawing explaining a lens moving mechanism section of an optical pickup.

FIG. 7 is a drawing explaining a lens moving mechanism section of an optical pickup.

In FIG. 7, 2 is the case, 3 is the laser beam source, 5 is the collimator lens, 9 is the lens moving mechanism, 95 is the lead screw, 96 is the rack gear, L is the length of the lead screw, and tc is the thickness of the wall of the case.

Because a number of parts are mounted on the optical pickup case 2, the distance between the lens moving mechanism 9 and the laser beam source 3 is narrow as shown in FIG. 7. Accordingly, the wall on the lens moving mechanism 9 side of the optical pickup case 2 was recessed and was thin as the thickness tc, and therefore it was difficult to secure the strength.

On the other hand, in the rack gear 96 of the present invention, by shortening the dimension of the width of the rack gear 96, the length L of the lead screw 95 could be shortened by the amount.

Accordingly, it became possible to increase the thickness tc of the wall of the optical pickup case 2 by the thickness tb which is the amount the length L of the lead screw 95 was shortened. Thus, the strength of the optical pickup case 2 can be increased. By increasing the strength, impact resistance of the optical pickup 1 can be improved and vibration and thermal deformation can be reduced, and therefore tolerance of the environmental tolerance performance can be secured.

As described above, according to the present invention, the dimension of the width of the rack gear can be reduced by the amount corresponding to increase of the twisting rigidity of the rack gear. As a result, the lead screw becomes short, and the collimator lens moving mechanism can be miniaturized, which results in widening of the internal space of the optical pickup.

The invention claimed is:

1. An optical pickup including a lens moving mechanism, the lens moving mechanism comprising:
   a lens holder holding a lens;
   a guide member guiding the lens holder;
   a lead screw having a thread groove on an outer periphery;
   a motor rotating the lead screw; and
   a rack gear having a body fixed to the lens holder, claws fitted into the thread groove of the lead screw and an arm connecting the body and the claws, wherein
   a plurality of projections extending in the rotational axis direction of the lead screw are arranged on the surface of the arm,
   wherein a plurality of grooves that extend in the rotational axis direction of the lead screw are arranged in the arm, and
   wherein a plurality of grooves are arranged on a back surface of the arm opposing the grooves extending in the rotational axis direction of the lead screw.

2. The optical pickup according to claim 1, wherein the arm is configured so that a shape of a cross section perpendicular to the rotational axis direction of the lead screw is constant over entire width of the rack gear.

3. The optical pickup according to claim 1, wherein the lens is a collimator lens.

4. An optical pickup, comprising:
   a laser beam source;
   an optical system;
   a photo-detector;
   a lens moving mechanism, which moves a lens of the optical system; and a case, which mounts the laser beam source, the optical system, the photo-detector and the lens moving mechanism; wherein the lens moving mechanism includes a lens holder, a guide member for the lens holder, a lead screw having a thread groove on an outer periphery, a motor connected to the lead screw, and a rack gear including a body fixed to the lens holder, claws fitted into the thread groove of the lead screw, an arm connecting the body and the claws, the arm being provided with a plurality of projections extending in the rotational axis direction of the lead screw on a surface of the arm, wherein the projections extending in the rotational axis direction of the lead screw are formed by a plurality of recesses extending in the rotational axis direction of the lead screw on the surface of the arm, and wherein a plurality of convex parts are arranged on a back surface of the arm opposing the recesses extending in the rotational axis direction of the lead screw, and recesses are formed according to the convex parts on the back surface.

5. The optical pickup according to claim 4, wherein the lens is a collimator lens.

6. An optical pickup, comprising:
a laser beam source;
an optical system;
a photo-detector;
a lens moving mechanism, which moves a lens of the optical system; and
a case, which mounts the laser beam source, the optical system, the photo-detector and the lens moving mechanism; wherein the lens moving mechanism includes a lens holder, a guide member for the lens holder, a lead screw having a thread groove on an outer periphery, a motor connected to the lead screw, and a rack gear including a body fixed to the lens holder, claws fitted into the thread groove of the lead screw, an arm connecting the body and the claws, the arm being provided with a plurality of projections extending in the rotational axis direction of the lead screw on a surface of the arm, wherein a cross-sectional shape of the arm is a wave-shape and the projections extending in the rotational axis direction of the lead screw are formed by the wave-shape.

7. The optical pickup according to claim 6, wherein a thickness of the arm is substantially constant between the claws and the body.

8. The optical pickup according to claim 6, wherein the lens is a collimator lens.

9. An optical pickup, including a lens moving mechanism, the lens moving mechanism comprising:
a lens holder holding a lens;
a guide member guiding the lens holder;
a lead screw having a thread groove on an outer periphery;
a motor rotating the lead screw; and
a rack gear having a body fixed to the lens holder, claws fitted into the thread groove of the lead screw and an arm connecting the body and the claws, wherein a plurality of projections extending in the rotational axis direction of the lead screw are arranged on the surface of the arm, and wherein a cross-sectional shape of the arm is a wave-shape and the projections extending in the rotational axis direction of the lead screw are formed by the wave-shape.

10. The optical pickup according to claim 9, wherein the lens is a collimator lens.

\* \* \* \* \*